(12) United States Patent
Gatto et al.

(10) Patent No.: US 9,850,779 B2
(45) Date of Patent: Dec. 26, 2017

(54) LUBRICATION SYSTEM FOR A GAS TURBINE ENGINE

(71) Applicant: Rolls-Royce Corporation, Indianapolis, IN (US)

(72) Inventors: Stephen M. Gatto, Carmel, IN (US); Vaino E. Ajango, Indianapolis, IN (US); Michael L. Benson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 441 days.

(21) Appl. No.: 14/794,480

(22) Filed: Jul. 8, 2015

(65) Prior Publication Data
US 2016/0010499 A1   Jan. 14, 2016

Related U.S. Application Data

(60) Provisional application No. 62/024,237, filed on Jul. 14, 2014.

(51) Int. Cl.
| | | |
|---|---|---|
| *F01D 25/18* | (2006.01) | |
| *F02C 7/06* | (2006.01) | |
| *B01D 45/16* | (2006.01) | |

(52) U.S. Cl.
CPC ............... *F01D 25/18* (2013.01); *F02C 7/06* (2013.01); *B01D 45/16* (2013.01); *F05D 2220/32* (2013.01); *F05D 2260/98* (2013.01)

(58) Field of Classification Search
CPC ..... F01D 25/18; F05D 2260/98; B01D 45/16; F02C 7/06; F16N 39/002; F01M 13/04; F01M 1/12; F16H 57/027

USPC ......................................................... 184/6.11
See application file for complete search history.

(56) References Cited

U.S. PATENT DOCUMENTS

| | | | | |
|---|---|---|---|---|
| 4,433,539 A | * | 2/1984 | Norris | F01D 25/18 184/6.11 |
| 4,531,358 A | * | 7/1985 | Smith | F01D 25/20 184/6.11 |
| 5,429,208 A | * | 7/1995 | Largillier | F01D 25/20 184/6.11 |
| 5,611,661 A | * | 3/1997 | Jenkinson | F01D 25/183 184/6.11 |
| 6,996,968 B2 | * | 2/2006 | Peters | F01D 25/18 60/39.08 |
| 7,373,780 B2 | | 5/2008 | Peters et al. | |
| 7,625,126 B2 | | 12/2009 | Peters et al. | |
| 8,028,524 B2 | * | 10/2011 | Middlebrook | F02B 33/40 123/559.1 |

(Continued)

FOREIGN PATENT DOCUMENTS

EP    1820944 A1    8/2007

OTHER PUBLICATIONS

Extended European Search Report for European Patent Application No. 15173238.5-1607, dated Dec. 18, 2015, 8 pages.

*Primary Examiner* — William E Dondero
*Assistant Examiner* — Mark K Buse
(74) *Attorney, Agent, or Firm* — Barnes & Thornburg LLP (57) ABSTRACT

A gas turbine engine includes a lubrication system for distributing lubricant throughout the engine. The lubrication system includes a breather assembly that receives air and lubricant from various other components of the lubrication system. The breather assembly includes a baffle that redirects air and lubricant received by the breather assembly.

18 Claims, 14 Drawing Sheets

(56) References Cited

U.S. PATENT DOCUMENTS

| | | |
|---|---|---|
| 8,146,711 B2 | 4/2012 | Dickie et al. |
| 8,181,746 B2 | 5/2012 | Szolomayer et al. |
| 8,601,785 B2 * | 12/2013 | Legare .................... F01D 25/20 184/6.11 |
| 8,621,839 B2 | 1/2014 | Alecu et al. |
| 8,764,867 B2 | 7/2014 | Brannon |
| 2007/0193276 A1 * | 8/2007 | Corattiyil .................. F02C 7/06 60/782 |
| 2014/0096533 A1 | 4/2014 | Homeyer et al. |
| 2016/0032770 A1 * | 2/2016 | Sheridan ............ B01D 19/0068 60/39.08 |

* cited by examiner

LUBRICATION SYSTEM FOR A GAS TURBINE ENGINE

CROSS REFERENCE TO RELATED APPLICATIONS

This application claims priority to and the benefit of U.S. Provisional Patent Application No. 62/024,237, filed 14 Jul. 2014, the disclosure of which is now expressly incorporated herein by reference.

FIELD OF THE DISCLOSURE

The present disclosure relates generally to gas turbine engines, and more specifically to lubrication systems within gas turbine engines.

BACKGROUND

Gas turbine engines are used to power aircraft, watercraft, power generators, and the like. Gas turbine engines generally include compressor wheels and turbine wheels coupled to shafts to form rotors that are supported in cases for rotation within the cases. The rotors are typically mounted on bearings that allow rotation relative to the cases. Most bearings perform best in a lubricated environment in which a lubricant reduces friction between components during rotation of the rotor.

Many gas turbine engines include lubrication systems that circulate lubricants throughout the engine. These lubrication systems may clean, cool, and distribute lubricants, such as oil, to bearings and other parts of the engine. To properly circulate lubricants through an engine, some lubrication systems control the air between lubricated cavities to encourage desired movement of the lubricant through the system.

SUMMARY

The present disclosure may comprise one or more of the following features and combinations thereof.

According to the present disclosure, a lubrication system for a gas turbine engine may include an oil tank, a sump housing a bearing, and a breather assembly. The breather assembly may be coupled to the oil tank, the sump, and atmosphere.

In some embodiments, the breather assembly may be configured to redirect oil droplets from the oil tank into the sump and vent carrier air carrying the oil droplets from the oil tank to atmosphere. The breather assembly may also vent pressurized air from the sump to the atmosphere without allowing the pressurized air to increase static pressure in the oil tank.

In some embodiments, the breather assembly may include a breather housing. The breather housing may define a breather cavity, a tank port arranged to transport oil droplets and carrier air from the oil tank into the breather cavity, a vent port arranged to transport air from the breather cavity to the atmosphere, a sump air-bleed port arranged to transport pressurized air from the sump into the breather cavity, and a sump oil-return port arranged to transport oil from the breather cavity to the sump.

In some embodiments, the sump air-bleed port may be arranged to direct pressurized air from the sump toward the tank port. The breather assembly may include a baffle arranged in the breather cavity between the tank port and the sump air-bleed port. The baffle may block pressurized air from the sump air-bleed port from directly impinging into the tank port.

In some embodiments, the baffle may include a plate formed to include a plurality of apertures sized to allow oil droplets moving through the tank port to pass through the baffle into the sump oil-return port. The plate may be formed to include a nozzle that extends into the vent port to guide air moving out of the breather cavity through the vent port. The nozzle may create a venturi effect to reduce cavity pressure.

In some embodiments, the baffle may include a trough coupled to the plate that forms a channel facing the tank port to receive oil droplets from the tank port. The trough may be arranged to block pressurized air from the sump air-bleed port from directly impinging into the tank port.

In some embodiments, the baffle may include a scoop coupled to the plate to form a passage between the scoop and the plate. The passage may be arranged to direct air from the sump air-bleed port toward the vent port.

In some embodiments, the breather housing may include a pad integrally formed in a frame and a cover coupled to the pad to define the breather cavity therebetween. The pad may be formed to include the sump air-bleed port and the sump oil-return port. The cover may be formed to include the tank port and the vent port. The baffle may be mounted between the pad and the cover and may extend across the entire breather cavity.

According to another aspect of the present disclosure, a lubrication system for a gas turbine engine may include an oil tank, a sump housing a bearing, and a breather assembly. The breather assembly may be coupled to the oil tank, the sump, and atmosphere. The breather assembly may include a breather housing that defines a breather cavity and a baffle arranged in the breather cavity.

In some embodiments, the baffle may be arranged between a tank port that leads from the breather cavity to the oil tank and a sump air-bleed port that leads from the breather cavity to the sump. The sump air-bleed port may be arranged to direct pressurized air from the sump toward the tank port. The baffle may block pressurized air from the sump air-bleed port from directly impinging into the tank port.

In some embodiments, the baffle may include a plate formed to include a plurality of apertures. The apertures may be sized to allow oil droplets moving through the tank port to pass through the baffle.

In some embodiments, the baffle may include a trough coupled to the plate that forms a channel facing the tank port to receive oil droplets from the tank port and that is arranged to block pressurized air from the sump air-bleed port from directly impinging into the tank port.

In some embodiments, the baffle may include a scoop coupled to the plate to form a passage between the scoop and the plate. The passage may be arranged to direct air from the sump air-bleed port toward the vent port.

In some embodiments, the breather assembly may include a vent port that leads from the breather cavity to the atmosphere and a sump oil-return port that leads from the breather cavity to the sump. The plate may be formed to include a nozzle that extends into the vent port. The nozzle may create a venturi effect to reduce cavity pressure.

In some embodiments, the breather housing may include a pad integrally formed in a frame and a cover coupled to the pad to define the breather cavity therebetween. The pad may be formed to include the sump air-bleed port and the cover may be formed to include the tank port.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
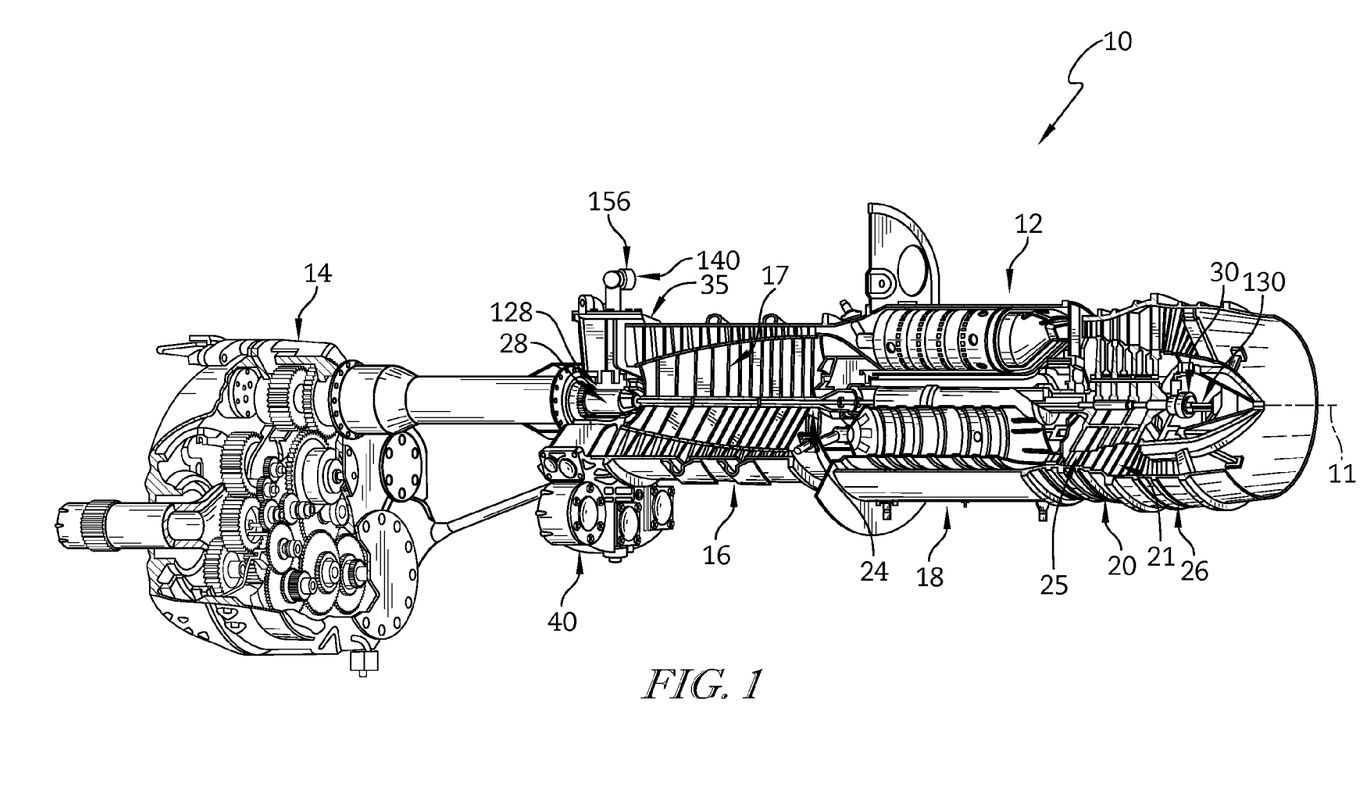
FIG. 1 is a perspective view of a gas turbine engine cut away to show that the engine includes a compressor, a combustor, and a turbine that cooperate to drive an output shaft attached to a gear box.

An illustrative gas turbine engine 10 includes an engine core 12 and a gear box 14 driven by the engine core 12 as shown in FIG. 1. The engine core includes a compressor 16, a combustor 18, and a turbine 20. The compressor 16 compresses and delivers air to the combustor 18. The combustor 18 mixes fuel with the compressed air received from the compressor 16 and ignites the fuel. The hot, high-pressure products from the burning fuel are directed into the turbine 20 and the turbine 20 extracts work to drive the compressor 16 and the gear box 14.

In the illustrative embodiment, the compressor 16 includes compressor wheels 17 and the turbine 20 includes turbine wheels 21 all mounted to a shaft 24 to provide a core rotor 25 as shown in FIG. 1. The core rotor 25 is mounted in a case assembly 26 for rotation about central axis 11 of the engine 10. To facilitate rotation of the core rotor 25 relative to the case assembly 26, the shaft 24 is supported on front and rear bearings 28, 30.

Each of the front and rear bearing 28, 30 is housed in a corresponding front or rear sump 128, 130 included in a lubrication system 110 of the engine 10 as shown in FIG. 1. The lubrication system 110 circulates oil through the front and rear sumps 128, 130 to lubricate the front and rear bearings 28, 30 reducing friction between the components of the bearings 28, 30.

Figure 2:
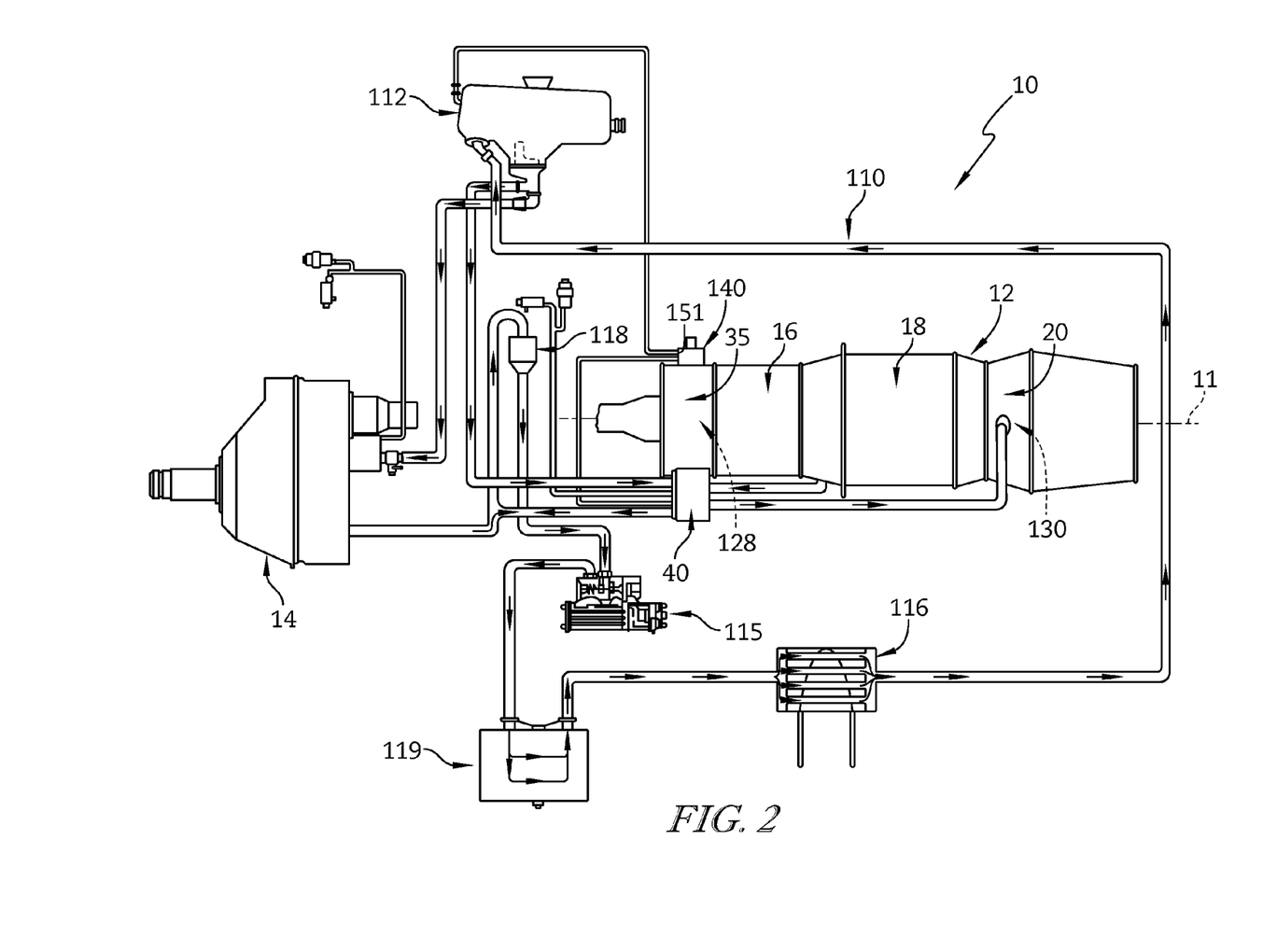
FIG. 2 is a partially diagrammatic view of the gas turbine engine of FIG. 1 showing a lubrication system integrated into the gas turbine engine.

The lubrication system 110 illustratively includes, among other things, an oil tank 112, the front sump 128, the rear sump 130, and a breather assembly 140 as shown diagrammatically in FIG. 2. The oil tank 112 stores and releases oil to the rest of the lubrication system 110. The front sump 128 houses and provides a lubricated environment for the front bearing 28. The rear sump 130 houses and provides a lubricated environment for the rear bearing 30. The breather assembly 140 directs oil from the oil tank and various air flows into and out of the front sump 128 as suggested in FIG. 3.

Figure 3:
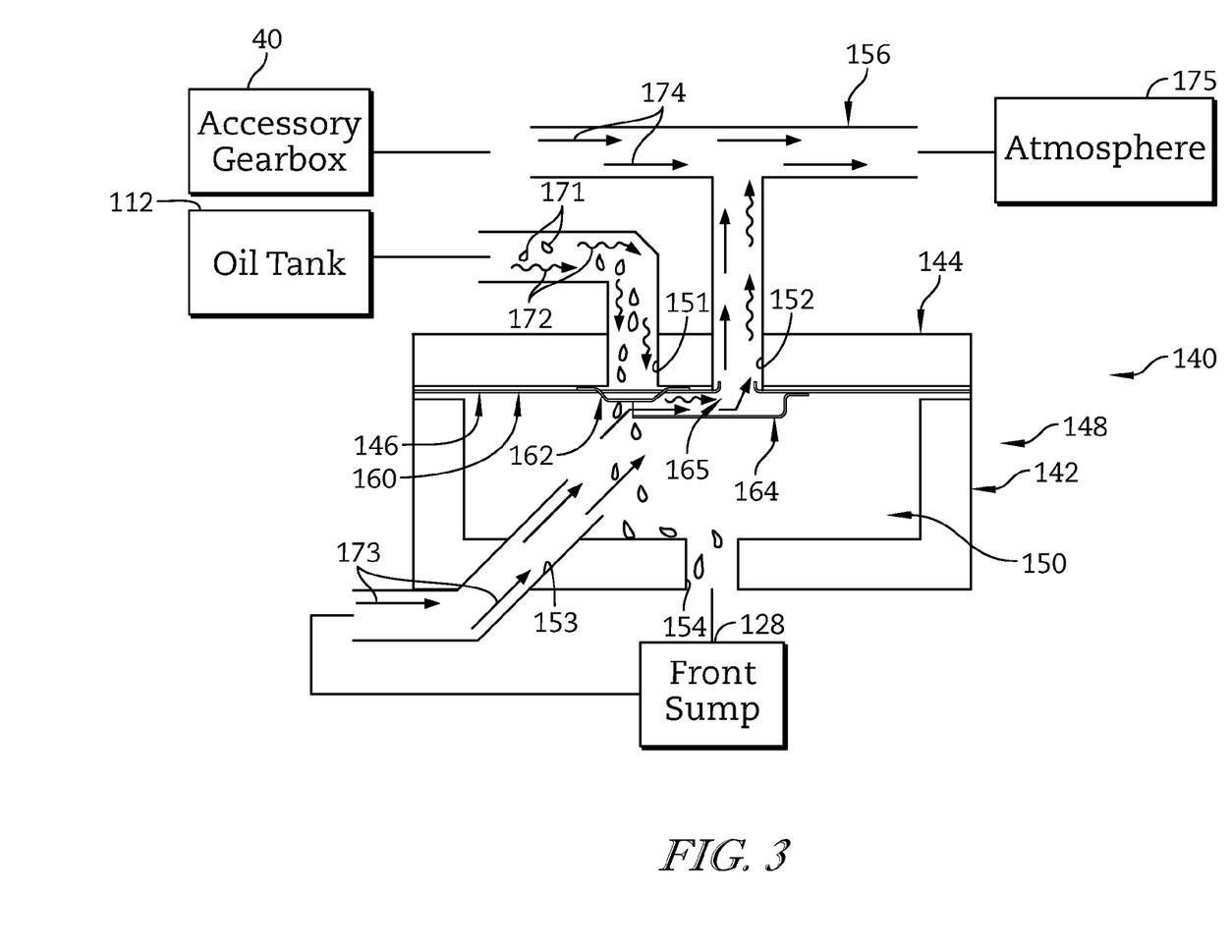
FIG. 3 is a diagrammatic view of a portion of the lubrication system of FIG. 2 showing a breather assembly coupled to an oil tank, a sump, and the atmosphere to distribute lubricant and air moving between the oil tank, the sump, and the atmosphere.
Figure 4:
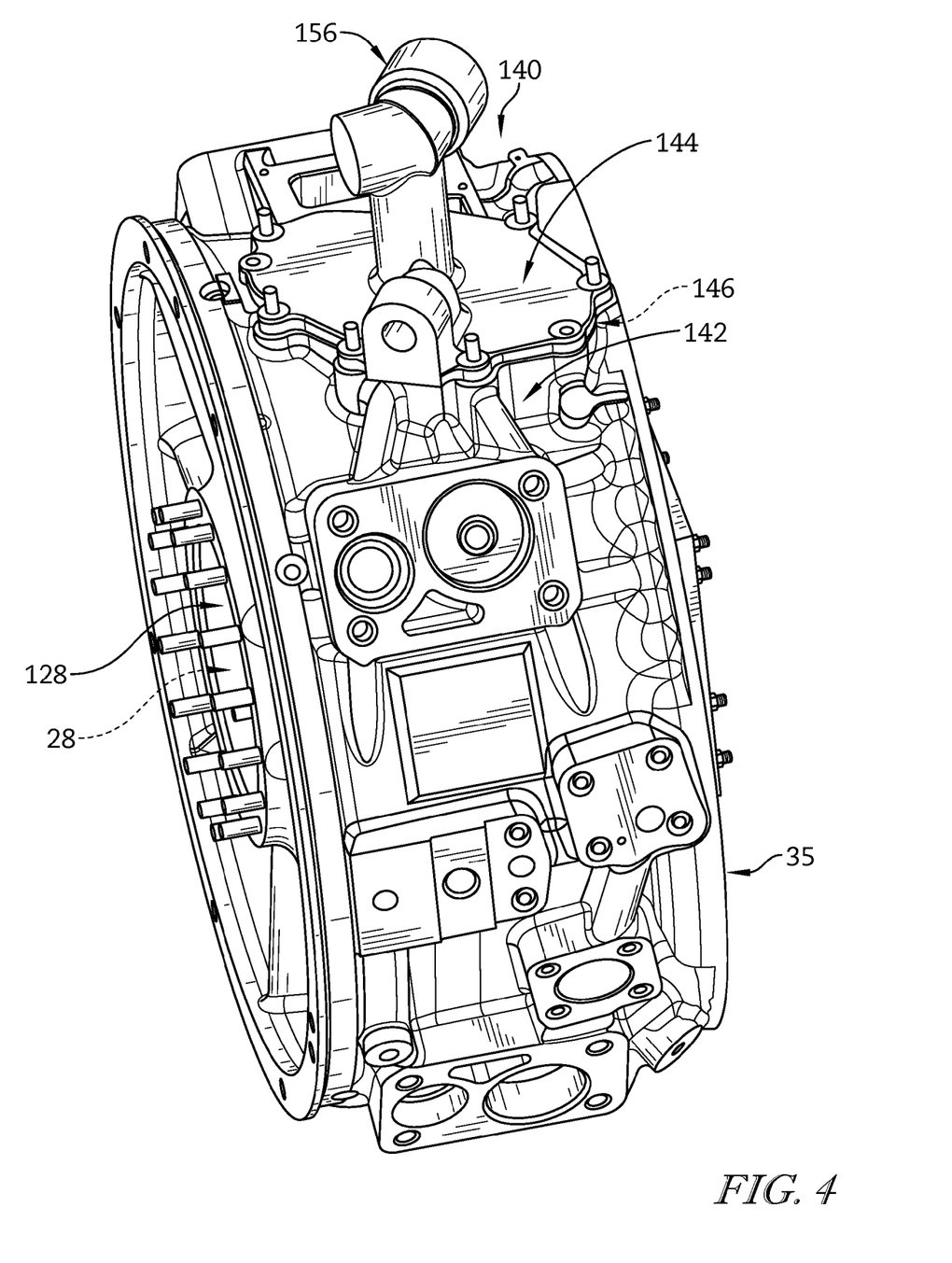
FIG. 4 is a perspective view of one illustrative breather assembly that forms part of the gas turbine engine of FIG. 1.
Figure 5:
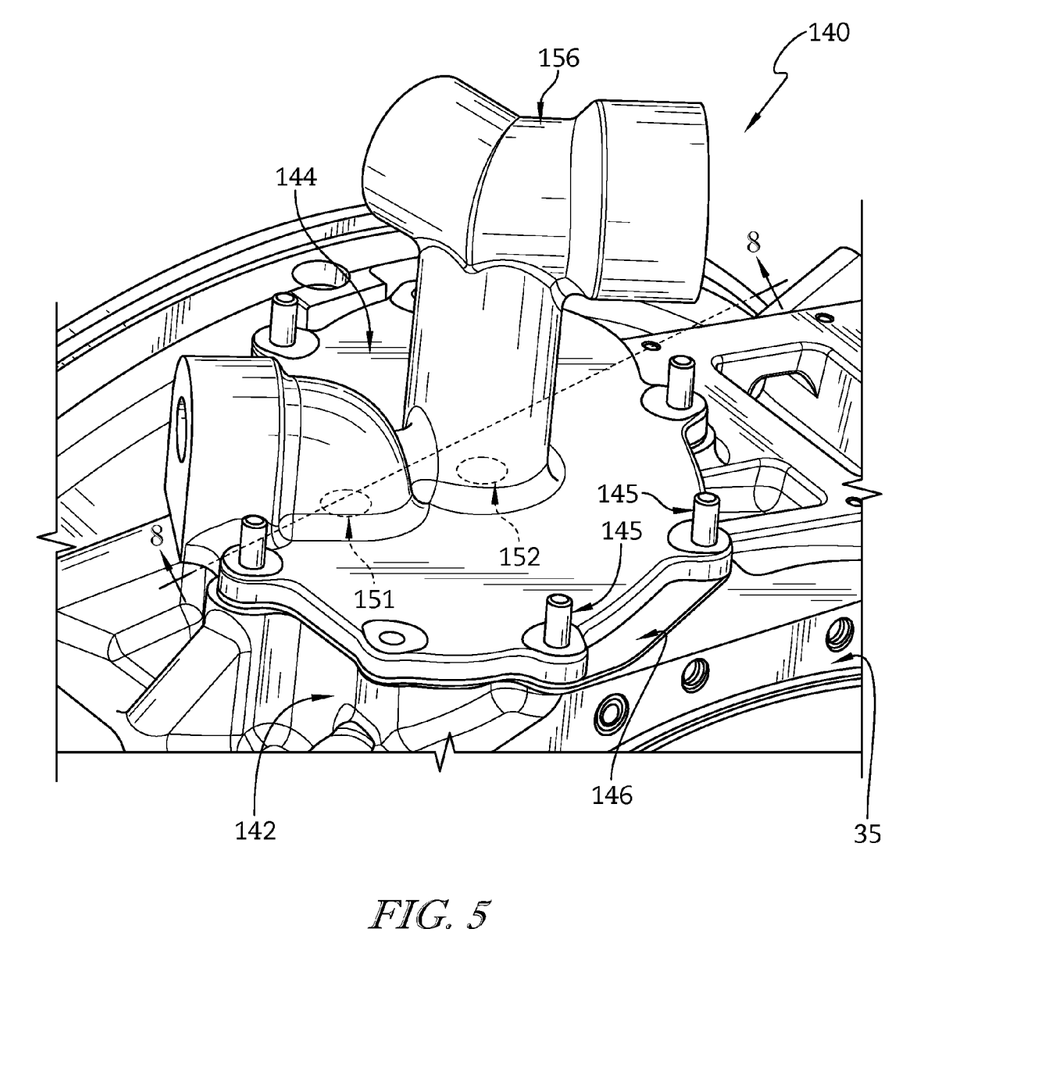
FIG. 5 is a detail view of the breather assembly of FIG. 4 cut away to show a first illustrative baffle included in the breather assembly.
Figure 6:
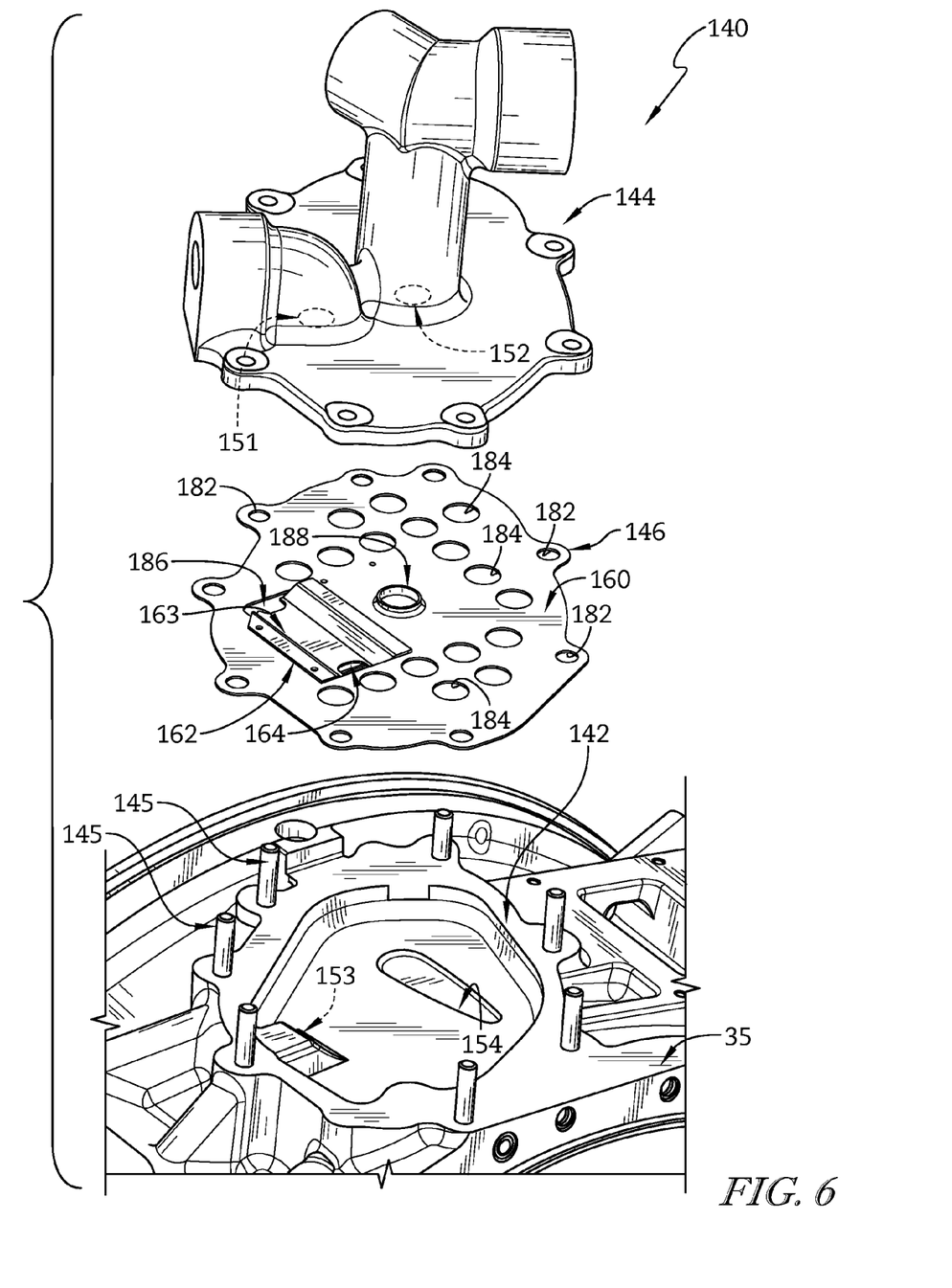
FIG. 6 is an exploded perspective view of the breather assembly of FIG. 5 showing that the breather assembly includes a pad, a cover, and the first baffle.

In the illustrative embodiment, the breather assembly 140 includes a pad 142, a cover 144, and a baffle 146 as shown diagrammatically in FIG. 3 and illustratively in FIGS. 4-6. The pad 142 is illustratively integrally formed as part of a front frame 35 of the engine 10 that forms the front sump 28. The cover 144 coupled to the pad 142 and cooperates with the pad 142 to define a breather cavity 150 that receives oil and various air flows from around the engine 10. The baffle 146 is located in the breather cavity 150 and redirects oil and air flows moving through the breather cavity 150 in a controlled manner.

The pad 142 and the cover 144 cooperate to provide a breather housing 148 as shown in FIG. 3. A tank port 151 arranged to transport venting oil droplets 171 and carrier air 172 from the oil tank 112 into the breather cavity 150 is formed in the cover 144. A vent port 152 arranged to transport air flows 172, 173 from the breather cavity 150 to the atmosphere 175 is also formed in the cover 144. A sump air-bleed port 153 arranged to transport pressurized air 173 from the front sump 128 into the breather cavity 150 is formed in the pad 142. A sump oil-return port 154 arranged to transport oil 171 from the breather cavity 150 to the front sump 128 is also formed in the pad 142.

In the illustrative embodiment, the sump air-bleed port 153 is arranged to direct relatively high energy pressurized air 173 bleeding out of the front sump 128 into the breather cavity 150 along a path that would directly impinge upon the tank port 151 as shown in FIG. 3. Direct impingement of the pressurized air 173 into the tank port 151 may dynamically increase the pressure at the tank port 151 and in the oil tank 112. The baffle 146 is illustratively arranged between the sump air-bleed port 153 and the tank port 151 as shown in FIG. 3 to block direct impingement of pressurized air 173 into the tank port 151 while also redirecting the pressurized air 173 toward the vent port 152. The redirected air causes a venturi effect which decreases the cavity pressure.

Oil droplets 171 from the oil tank 112 are carried into the breather cavity 150 from the oil tank 112 by carrier air 172 moving from the oil tank 112 to the breather assembly 140 as suggested in FIG. 3. The oil droplets 171 are allowed to pass through the baffle 146 and into the front sump 128. The carrier air 172 is redirected by the baffle 146 toward the vent port 152.

Figure 7:
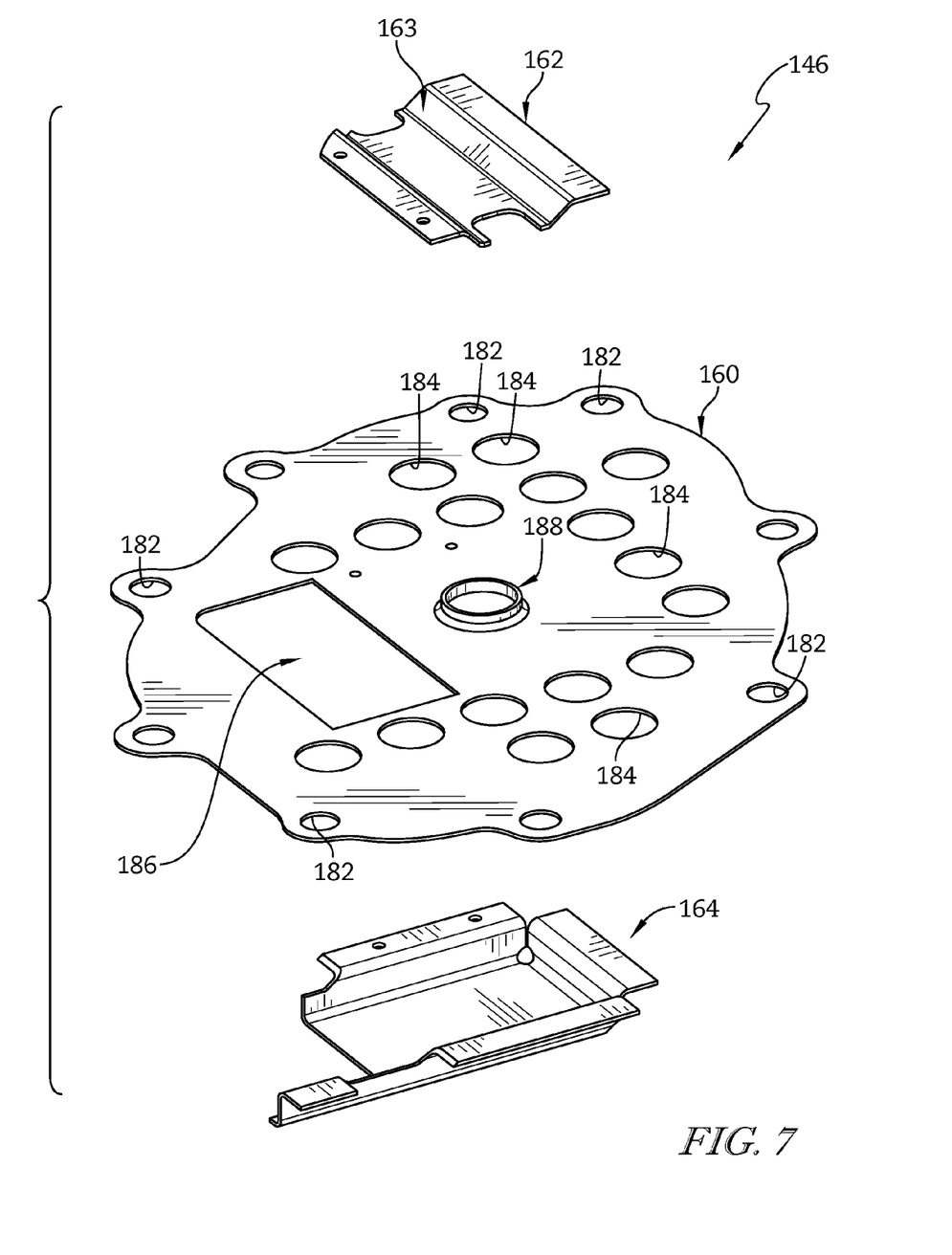
FIG. 7 is an exploded perspective view of the first baffle included in the breather assembly of FIGS. 4-6 showing that the baffle includes a plate, a scoop, and a trough.

The first illustrative baffle 146 shown in FIGS. 6 and 7 includes a plate 160, a trough 162, and a scoop 164. The plate 160 is coupled to the breather housing 148 and extends across the entire breather cavity 150. The trough 162 is coupled to the plate 160, illustratively by welding, and is arranged in the breather cavity 150 adjacent to the tank port 151. The scoop 164 is also coupled to the plate 160, illustratively by welding, and is arranged in the breather cavity 150 adjacent to the vent port 152.

The plate 160 is illustratively formed to include a plurality of mount holes 182, a plurality of fluid passage apertures 184, a drainage slot 186, and a nozzle 188 as shown in FIG. 7. The mount holes 182 are arranged around the periphery of the plate 160 and receive fasteners 145 that couple the pad 142 to the cover 144 and the plate 160. The fluid passage apertures 184 are arranged in various locations around the interior of the plate 160 and conduct sloshed oil and various air flows through the breather cavity 150. The drainage slot 186 is arranged adjacent to the tank port 151 so that most oil droplets 171 move through the slot 186. The nozzle 188 extends into the vent port 152 to guide air moving out of the breather cavity 150 through the vent port 152 and to cause a venturi effect.

The trough 162 extends through the slot 186 and is arranged to catch and redirect oil droplets 171 moving through the slot 186 as suggested in FIGS. 3 and 7. More particularly, the trough 162 forms a channel 163 facing the tank port 151 to receive oil droplets 171 from the tank port and is arranged to block pressurized air 173 from the sump air-bleed port 153 from directly impinging into the tank port 151.

Figure 8:
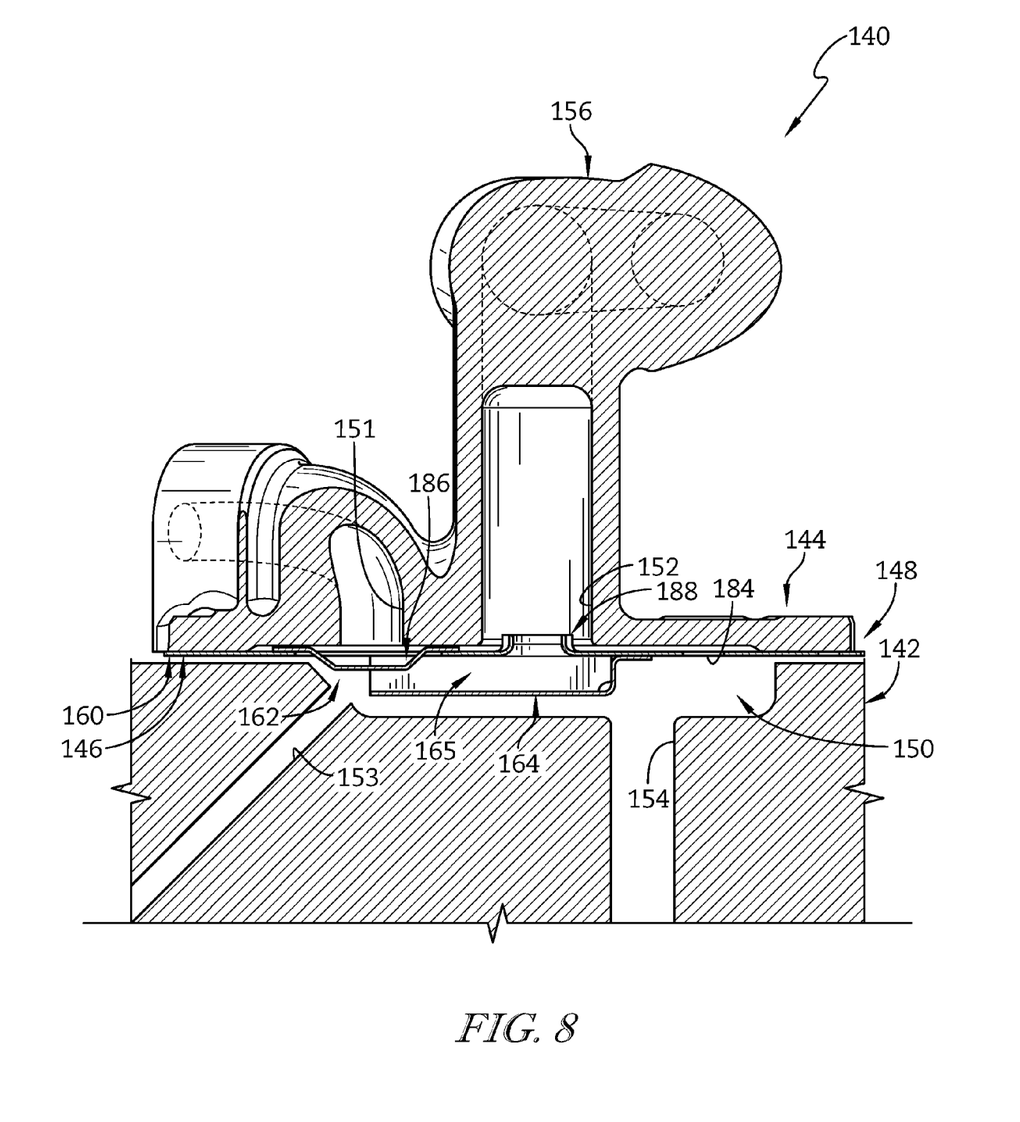
FIG. 8 is a cross-sectional view of a portion of the breather assembly of FIG. 5 taken along line 8-8 showing the arrangement of the first baffle within the breather assembly.

The scoop 164 is illustratively coupled to the plate 160 to form a passage 165 between the scoop 164 and the plate 160 as shown in FIGS. 3 and 8. The passage 165 is arranged to direct air from the sump air-bleed port 153 toward the nozzle 188 of the plate 160 and the vent port 152.

In the illustrative embodiment, breather assembly 140 also includes a three-way, or T, connector 156 as shown diagrammatically in FIG. 3 and illustratively in FIG. 5. The connector 156 fluidly couples the vent port 152 with the atmosphere 175 and with another source of pressurized air 174, illustratively an accessory gear box 40 of the engine 10. The pressurized air 174 passing from the gear box 40 through the connector 156 past the vent port 152 creates a vacuum effect at the vent port 152 so that air in the breather cavity 150 is attracted to the vent port 152 for venting to the atmosphere 175.

The lubrication system 110 also includes oil coolers 115, 116 and oil filters 118, 119 as shown diagrammatically in FIG. 2. The coolers 115, 116 use fuel and/or air to cool oil moving through the lubrication system 110. The oil filter 118 cleans oil moving through the lubrication system 110.

Figure 9:
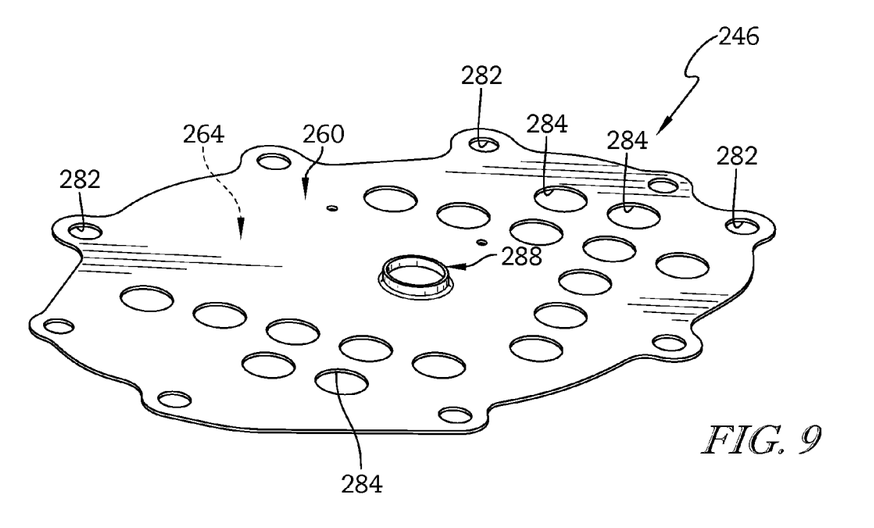
FIG. 9 is a perspective view of a second baffle adapted for use in the breather assembly of FIGS. 4-7.
Figure 10:
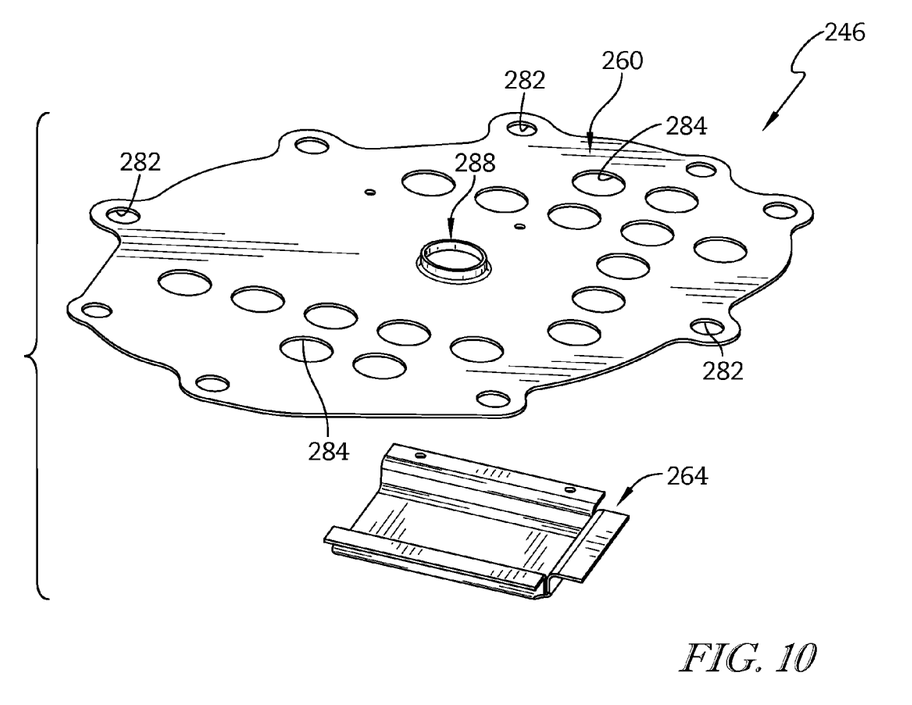
FIG. 10 is an exploded perspective view of the second baffle of FIG. 9 showing that the second baffle includes a plate and a scoop.
Figure 11:
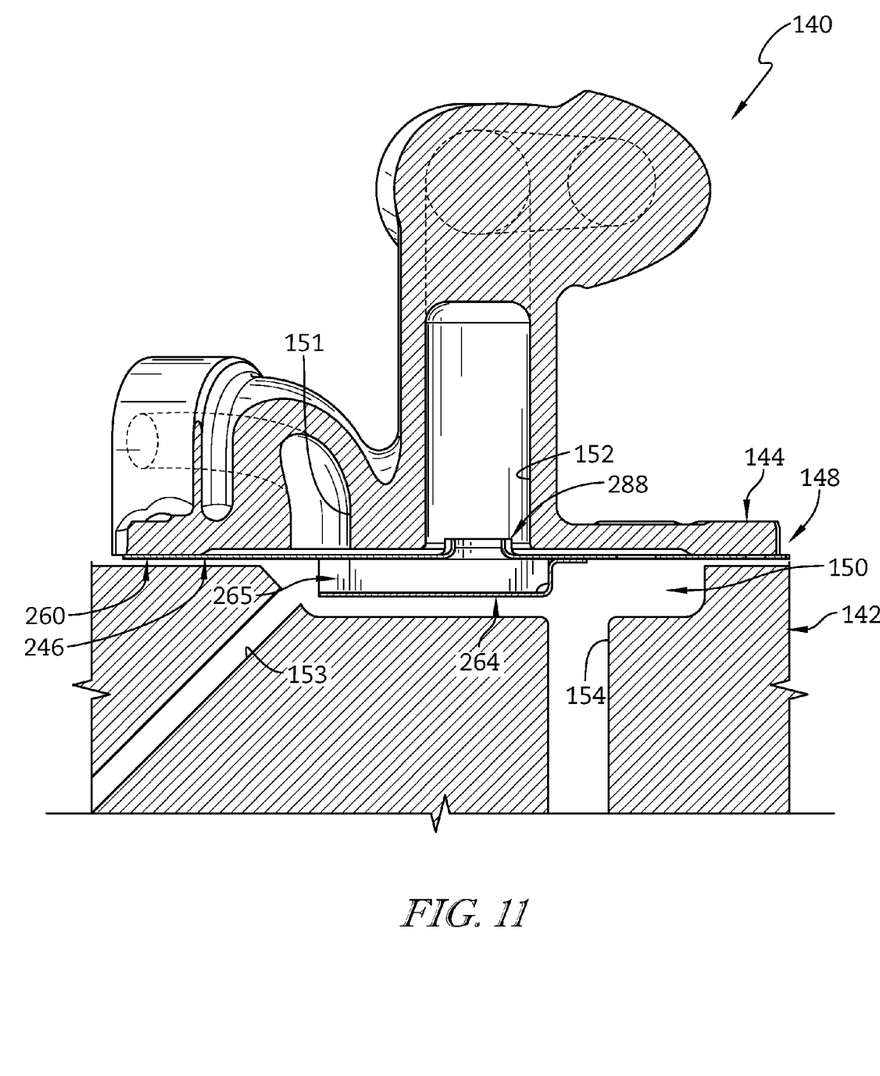
FIG. 11 is a cross-sectional view of a portion of the breather valve of FIGS. 4-7 including the second baffle of FIGS. 9 and 10.

Turning now to FIGS. 9-11, a second illustrative baffle 246 adapted for use in the breather assembly 140 is shown. The second illustrative baffle 246 includes a plate 260 and a scoop 264. The plate 260 may be coupled to the breather housing 148 and may extend across the entire breather cavity 150 as shown in FIG. 11. The scoop 264 is also coupled to the plate 260, and is arranged in the breather cavity 150 adjacent to the vent port 152.

The plate 260 is illustratively formed to include a plurality of mount holes 282, a plurality of fluid passage apertures 284, and a nozzle 288 as shown in FIG. 10. The mount holes 282 are arranged around the periphery of the plate 260 and receive fasteners 145 that couple the pad 142 to the cover 144 and the plate 260. The fluid passage apertures 284 are arranged in various locations around the interior of the plate 260 and conduct sloshed oil and various air flows through the breather cavity 150. However, the plate 260 is solid between the sump bleed-air port 153 and the tank port 151. The nozzle 288 extends into the vent port 152 to guide air moving out of the breather cavity 150 through the vent port 152. Accordingly, the nozzle may create a venturi effect to reduce cavity pressure.

The scoop 264 is illustratively coupled to the plate 160 to form a passage 265 between the scoop 264 and the plate 260 as shown in FIG. 11. The passage 265 is arranged to direct air from the sump air-bleed port 153 toward the nozzle 188 of the plate 260 and the vent port 152.

Figure 12:
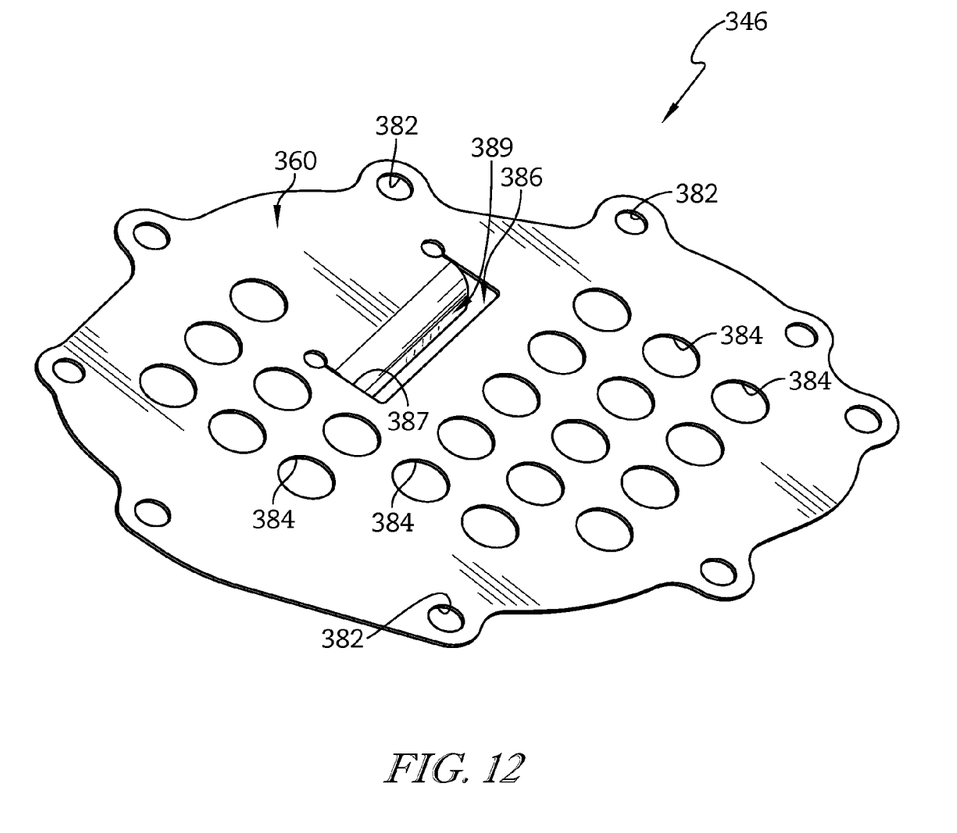
FIG. 12 is a perspective view of a third baffle adapted for use in the breather assembly of FIGS. 4-7.
Figure 13:
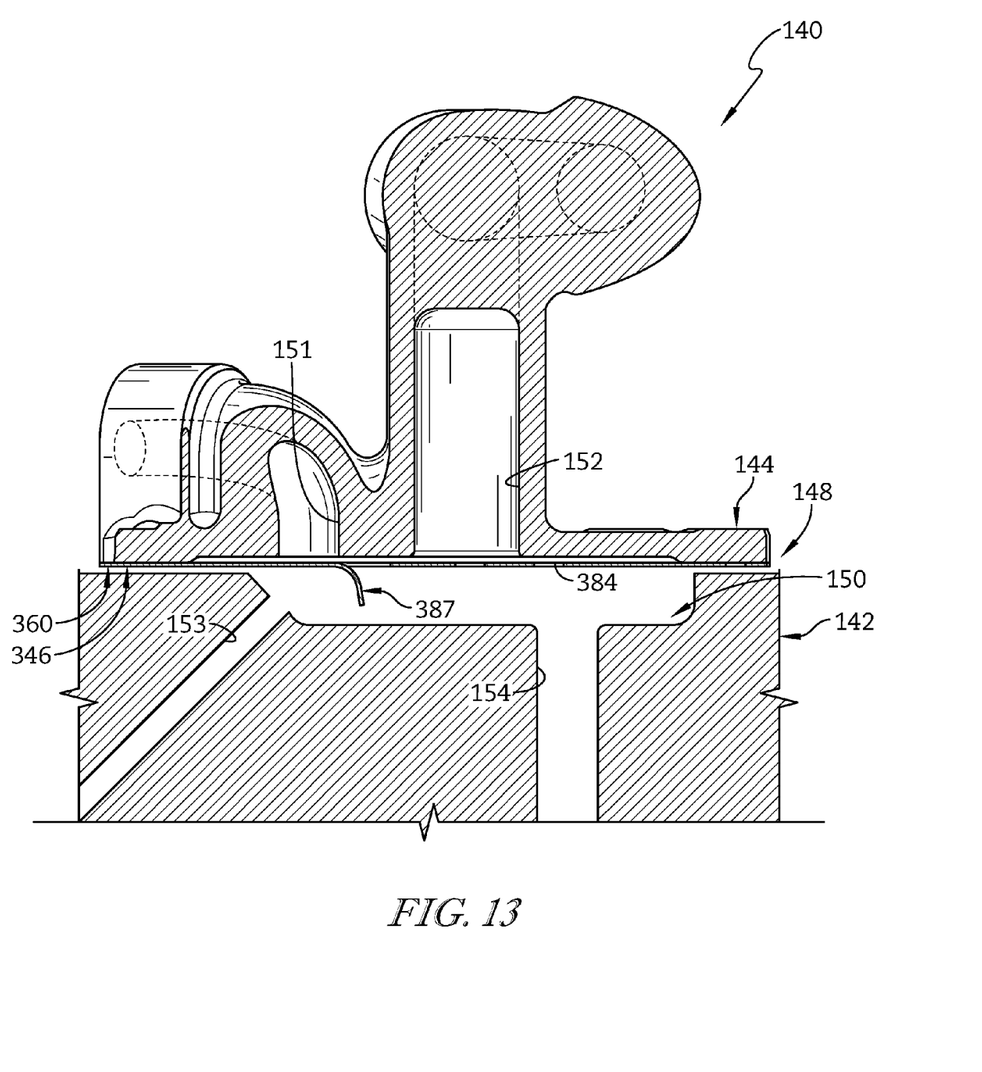
FIG. 13 is a cross-sectional view of the breather valve of FIGS. 4-7 including the third baffle of FIG. 12.

Turning now to FIGS. 12-13, a third illustrative baffle 346 adapted for use in the breather assembly 140 is shown. The third illustrative baffle 346 includes a plate 360. The plate 360 is monolithic/unitary and may be coupled to the breather housing 148 and may extend across the entire breather cavity 150 as shown in FIG. 13.

The plate 360 is illustratively formed to include a plurality of mount holes 382, a plurality of fluid passage apertures 384, and a drainage slot 386 as shown in FIG. 13. The mount holes 382 are arranged around the periphery of the plate 360 and receive fasteners 145 that couple the pad 142 to the cover 144 and the plate 360. The fluid passage apertures 384 are arranged in various locations around the interior of the plate 360 and conduct sloshed oil and various air flows through the breather cavity 150. The drainage slot 386 is formed by a U-shaped cut 387 in the plate 360 providing a flap 389. The flap 389 is bent out of plane with the rest of the plate 360 and is arranged to block pressurized air 173 from the front sump 128 from impinging directly into the slot 386 and the tank port 151. The slot 386 is arranged adjacent to the tank port 151 so that most oil droplets 171 move through the slot 386.

Figure 14:
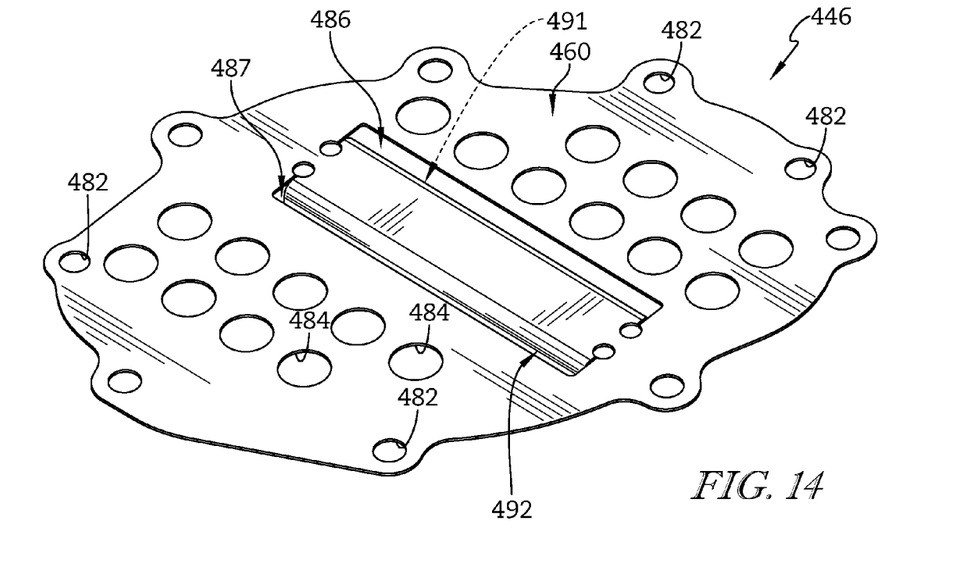
FIG. 14 is a top perspective view of a fourth baffle adapted for use in the breather assembly of FIGS. 4-7.
Figure 15:
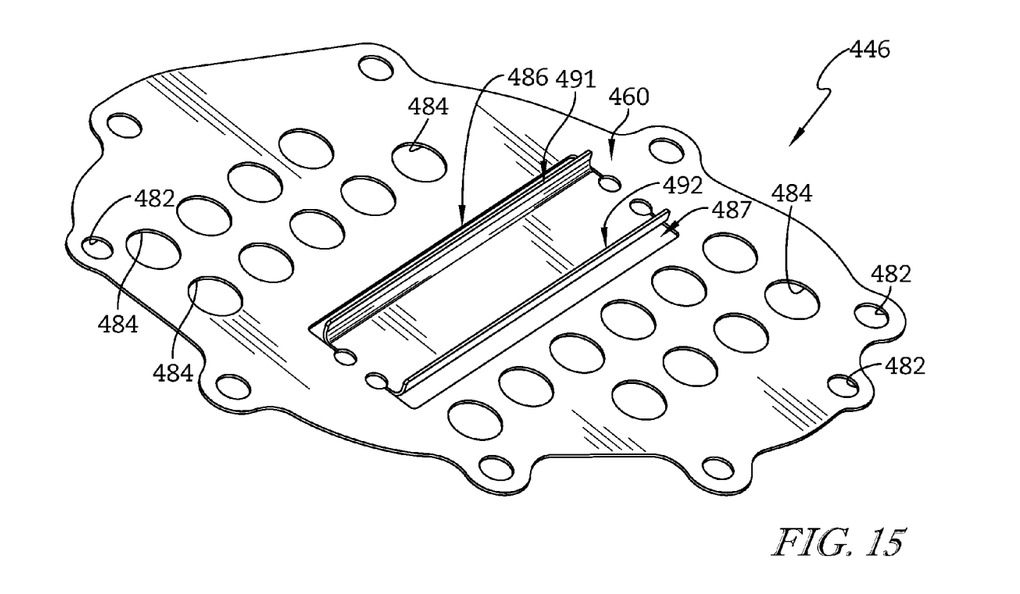
FIG. 15 is a bottom perspective view of a fourth baffle of FIG. 14.
Figure 16:
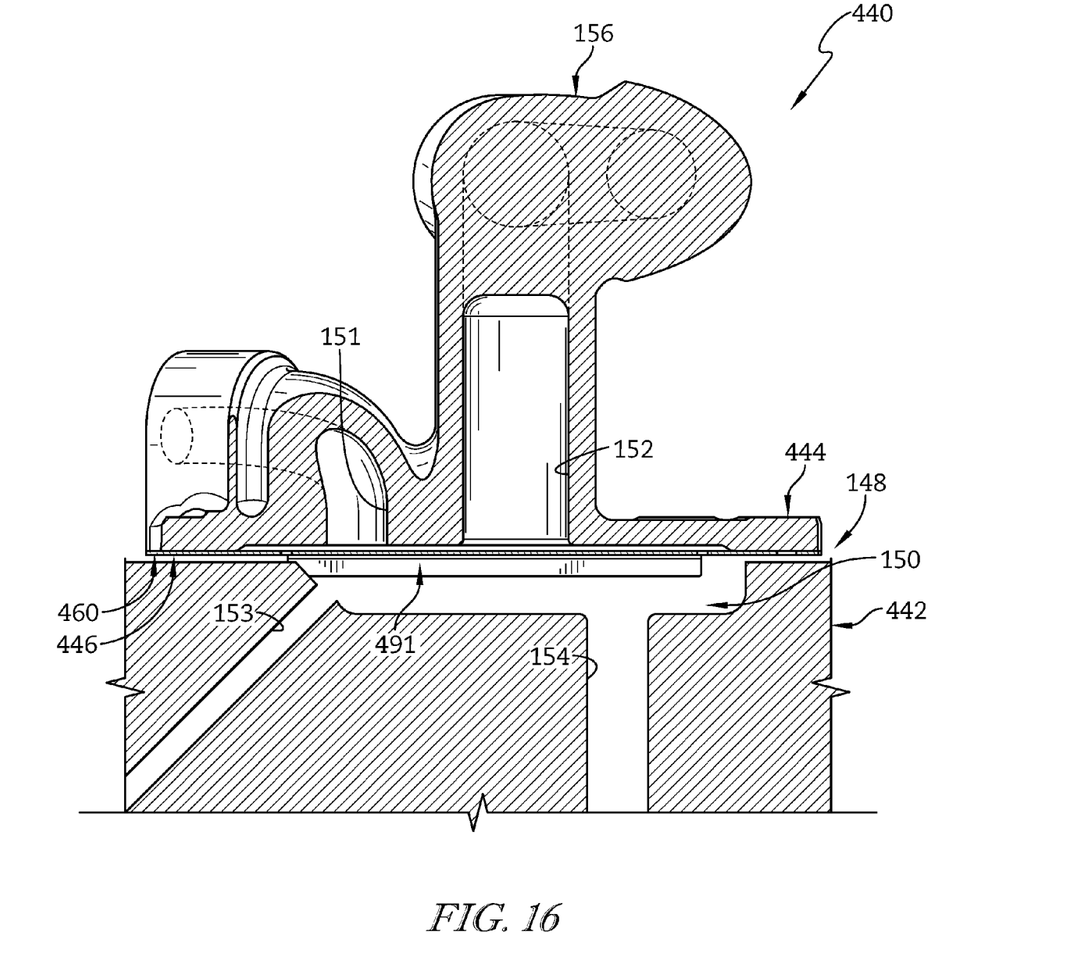
FIG. 16 is a cross-sectional view of a portion of the breather valve of FIGS. 4-7 including the fourth baffle of FIGS. 14 and 15.

Turning now to FIGS. 14-16, a fourth illustrative baffle 446 adapted for use in the breather assembly 140 is shown. The fourth illustrative baffle 446 includes a monolithic/ unitary plate 460. The plate 460 may be coupled to the breather housing 148 and may extend across the entire breather cavity 150 as shown in FIG. 11.

The plate 460 is illustratively formed to include a plurality of mount holes 482, a plurality of fluid passage apertures 484, and drainage slots 486, 487 as shown in FIG. 16. The mount holes 482 are arranged around the periphery of the plate 460 and receive fasteners 145 that couple the pad 142 to the cover 144 and the plate 460. The fluid passage apertures 484 are arranged in various locations around the interior of the plate 460 and conduct sloshed oil and various air flows through the breather cavity 150. The drainage slots 486, 487 are formed by U-shaped cuts in the plate 460 providing flaps 491, 492. The flaps 491, 492 are bent out of plane with the rest of the plate 460 and are arranged to block pressurized air 173 from the front sump 128 from impinging directly into corresponding slots 486, 487 and the tank port 151. The slots 486, 487 are arranged adjacent to the tank port 151 so that most oil droplets 171 move through the slots 486, 487.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A lubrication system for a gas turbine engine, the lubrication system comprising
an oil tank,
a sump housing a bearing, and
a breather assembly coupled to the oil tank, the sump, and atmosphere, the breather assembly including a breather housing that defines a breather cavity, a tank port arranged to transport oil droplets and carrier air from the oil tank into the breather cavity, a vent port arranged to transport air from the breather cavity to the atmosphere, a sump air-bleed port arranged to transport pressurized air from the sump into the breather cavity, and a sump oil-return port arranged to transport oil from the breather cavity to the sump,
wherein the breather assembly further includes a baffle arranged in the breather cavity between the tank port and the sump air-bleed port to block pressurized, relatively high-velocity air from the sump air-bleed port from directly impinging into the tank port.

2. The lubrication system of claim 1, wherein the sump air-bleed port is arranged to direct pressurized air from the sump toward the tank port and to create a venturi to reduce total cavity pressure.

3. The lubrication system of claim 1, wherein the baffle includes a plate formed to include a plurality of apertures sized to allow oil droplets moving through the tank port to pass through the baffle into the sump oil-return port.

4. The lubrication system of claim 3, wherein the plate is formed to include a nozzle that extends into the vent port to guide air moving out of the breather cavity through the vent port.

5. The lubrication system of claim 3, wherein the baffle includes a trough coupled to the plate that forms a channel facing the tank port to receive oil droplets from the tank port and that is arranged to block pressurized air from the sump air-bleed port from directly impinging into the tank port.

6. The lubrication system of claim 5, wherein the baffle includes a scoop coupled to the plate to form a passage between the scoop and the plate and the passage is arranged to direct air from the sump air-bleed port toward the vent port.

7. The lubrication system of claim 1, wherein the breather housing includes a pad integrally formed in a frame and a cover coupled to the pad to define the breather cavity therebetween.

8. The lubrication system of claim 7, wherein the pad is formed to include the sump air-bleed port and the sump oil-return port and wherein the cover is formed to include the tank port and the vent port.

9. The lubrication system of claim 7, wherein the baffle is mounted between the pad and the cover and extends across the entire breather cavity.

10. A lubrication system for a gas turbine engine, the lubrication system comprising
an oil tank,
a sump housing a bearing, and
a breather assembly coupled to the oil tank, the sump, and atmosphere, the breather assembly including a breather housing that defines a breather cavity and a baffle arranged in the breather cavity between a tank port that leads from the breather cavity to the oil tank and a sump air-bleed port that leads from the breather cavity to the sump to block pressurized air from the sump air-bleed port from directly impinging into the tank port.

11. The lubrication system of claim 10, wherein the sump air-bleed port is arranged to direct pressurized, relatively high-velocity air from the sump toward the tank port.

12. The lubrication system of claim 10, wherein the baffle includes a plate formed to include a plurality of apertures sized to allow oil droplets moving through the tank port to pass through the baffle.

13. The lubrication system of claim 12, wherein the baffle includes a trough coupled to the plate that forms a channel facing the tank port to receive oil droplets from the tank port and that is arranged to block pressurized air from the sump air-bleed port from directly impinging into the tank port.

14. The lubrication system of claim 12, wherein the baffle includes a scoop coupled to the plate to form a passage between the scoop and the plate and the passage is arranged to direct air from the sump air-bleed port toward the vent port.

15. The lubrication system of claim 12, wherein the breather assembly includes a vent port that leads from the breather cavity to the atmosphere and a sump oil-return port that leads from the breather cavity to the sump.

16. The lubrication system of claim 15, wherein the plate is formed to include a nozzle that extends into the vent port and to create a venturi to reduce total cavity pressure.

17. The lubrication system of claim 10, wherein the breather housing includes a pad integrally formed in a frame and a cover coupled to the pad to define the breather cavity therebetween.

18. The lubrication system of claim 17, wherein the pad is formed to include the sump air-bleed port and wherein the cover is formed to include the tank port.

* * * * *